Figure 1:
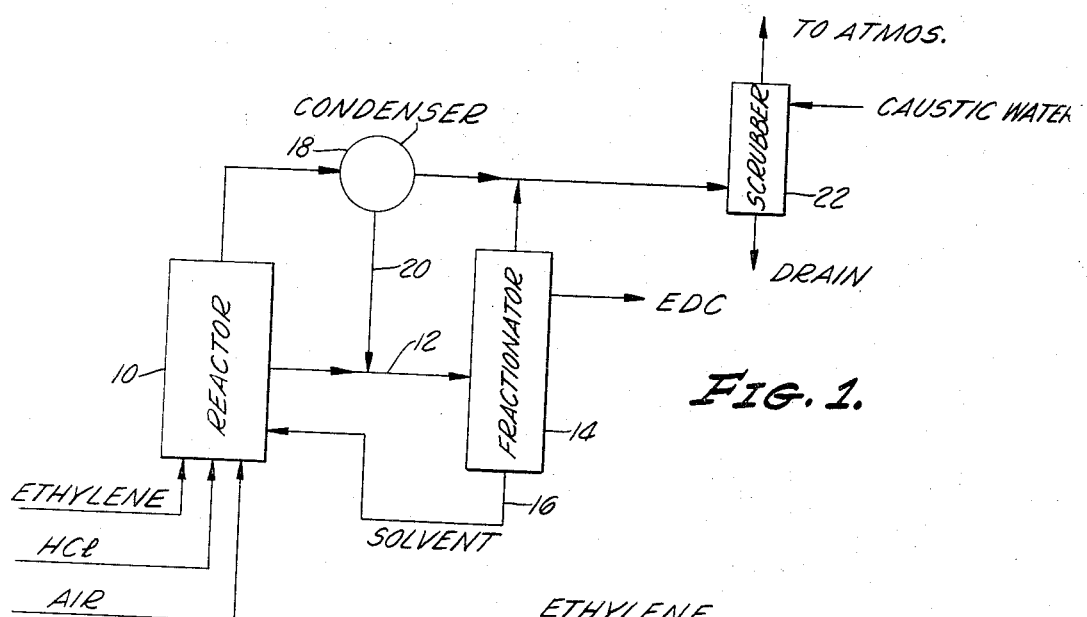

CHARLES H. HAYES
FREDERICK F. CASERIO, JR.
ROBERT Y. MIXER
INVENTORS.

BY Donald W Canady
ATTORNEY.

United States Patent Office 3,341,612
Patented Sept. 12, 1967

3,341,612
METHOD FOR SYNTHESIZING VICINAL DICHLORIDES
Charles H. Hayes, Anaheim, Frederick F. Caserio, Jr., Laguna Beach, and Robert Y. Mixer, Orange, Calif., assignors to Atlantic Richfield Company, a corporation of Pennsylvania
Filed May 20, 1964, Ser. No. 368,941
13 Claims. (Cl. 260—659)

The present invention relates to a method for making vicinal dichlorides by the oxychlorination of an olefinic hydrocarbon in a liquid medium, and more particularly relates to a process for synthesizing a vicinal dichloride by reacting a polyvalent metal chloride in its higher oxidized state with an olefinic hydrocarbon in a liquid solvent at relatively low temperatures.

Vicinal dichlorides such as ethylene dichloride are useful as solvents, chemical intermediates, fumigants, gametocides, and as a component of anti-knock fluids for gasoline, etc. One of the most important uses for ethylene chloride at the present time is for the production of vinyl chloride by pyrolysis.

Ethylene dichloride is presently synthesized mostly by vapor-phase techniques which require reaction temperatures in the vicinity of 300° C. and which produce undesirable by-products with an accompanying substantial loss of catalyst. The material handling costs in vapor-phase processes where a vapor is in contact with a fixed bed or a fluidized catalyst, are high and such processes result in less uniformity than that encountered in liquid phase processes. Prior art vapor phase processes for producing ethylene dichloride involve chlorinating ethane and often result in the production of ethyl chloride rather than the more resirable ethylene dichloride. Chlorine gas is used in the liquid phase prior art processes for producing ethylene dichloride resulting in the production of hydrogen chloride which presents a substantial chemical disposal problem.

In the prior art, olefins have been reacted with cupric chloride in acetonitrile; however, the only dichloride reported was an incidental production of styrene dichloride which, of course, is produced from a much more active olefin than the paraffinic olefins. This work was reported in the Journal of the Chemical Society, 1887 (1963).

It is, therefore, an object of our present invention to provide a liquid phase process for chlorinating olefinic hydrocarbons to produce vicinal dichlorides.

It is also an object of our present invention to provide a liquid phase process for chlorinating olefinic hydrocarbons with a polyvalent metal chloride to produce a vicinal dichloride.

It is a further object of my present invention to provide a liquid phase process for the oxychlorination of an olefinic hydrocarbon with a polyvalent metal chloride wherein said metal chloride is continuously regenerated.

It is a further object of our present invention to provide for use with a liquid phase process for the chlorination of an olefinic hydrocarbon with a polyvalent metal chloride, a method for regenerating said metal chloride by oxychlorination.

Other objects and a more complete understanding of our present invention will become apparent from the following specification and the appended claims when taken in conjunction with the drawings, wherein: FIG. 1 shows a flow diagram of a one stage process embodying our present invention; and FIG. 2 shows a flow diagram of a two stage process embodying our present invention.

Briefly stated the present invention involves the production of ethylene dichloride by the oxychlorination of gaseous olefinic hydrocarbons such as ethylene with hydrogen chloride and an oxygen containing gas in the presence of cupric chloride in a liquid organic nitrile solvent at relative low temperatures.

Figure 2:
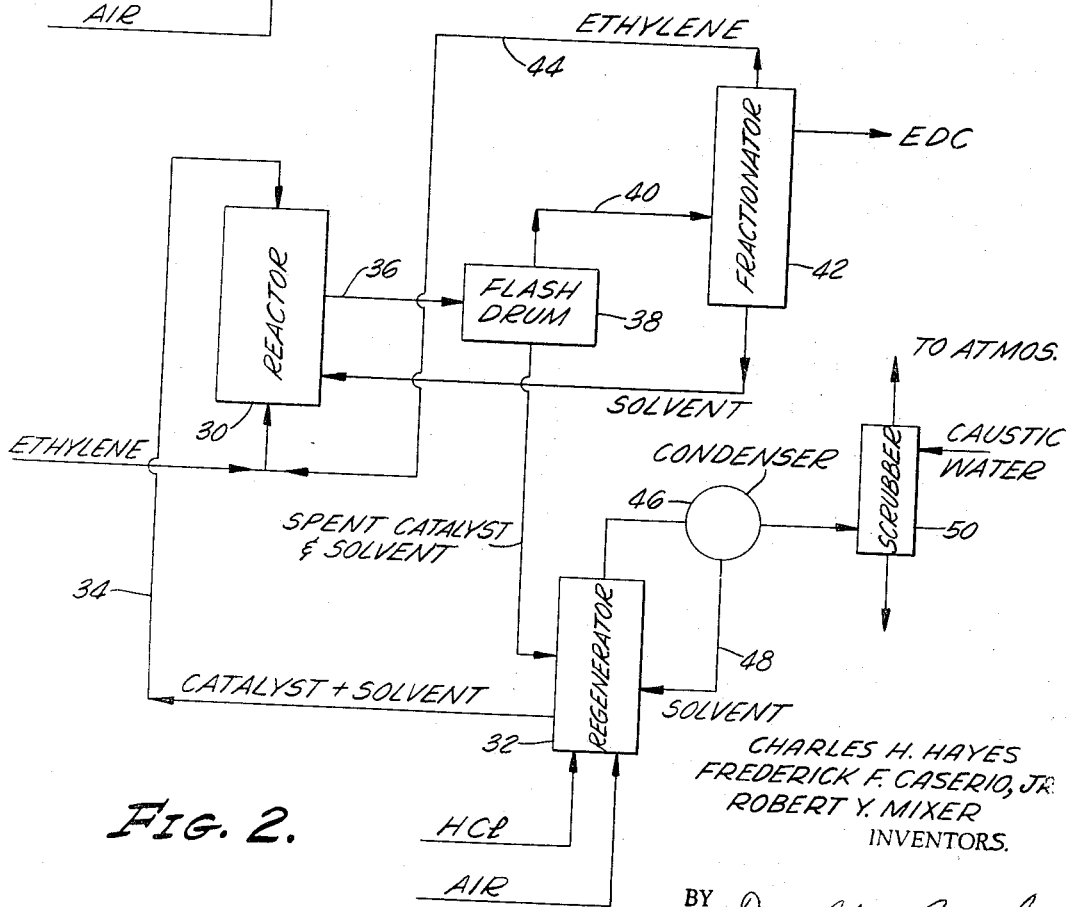

The proces of our present invention may be practiced continuously in a single reactor as shown in FIG. 1, or it may be conducted in two stages, as shown in FIG. 2, the first stage accomplishing the chlorination of the olefin to produce ethylene dichloride, as cupric chloride is reduced to cuprous chloride in an organic nitrile solvent. Ethylene and ethylene dichloride are separated by flashing, distillation, etc., and the nitrile solvent containing cuprous chloride in the form of a cuprous chloride-nitrile complex transferred to a second reactor or regenerator where the regeneration of cupric chloride is effected by treating the cuprous chloride-organic nitrile complex solution with hydrogen chloride and an oxygen containing gas to produce cupric chloride and water. Although it is convenient to perform the second stage reaction in the nitrile solvent since the regenerated CuCl₂ is recirculated to the first stages, this regeneration reaction may also be conducted in the presence of other solvents or in the absence of a solvent.

With reference to the drawings, FIG. 1 represents a one stage continuous regeneration process where ethylene, hydrogen chloride, and air are charged to the reactor 10 which contains cupric chloride partially dissolved in a nitrile solvent. The reactor 10 is provided with mechanical stirring means whereby the undissolved cupric chloride catalyst is maintained in suspension in the nitrile solvent. The overall reaction conducted in the reactor 10 may be shown by the following equation:

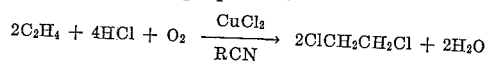

$$2C_2H_4 + 4HCl + O_2 \xrightarrow[RCN]{CuCl_2} 2ClCH_2CH_2Cl + 2H_2O$$

In the production of ethylene dichloride, cupric chloride is continuously reduced to cuprous chloride which is believed to form a complex with the nitrile solvent. The cuprous chloride is continuously regenerated in the reactor 10 to cupric chloride by reaction with the hydrogen chloride and the oxygen introduced into the reactor. Ethylene dichloride produced in the reactor is recovered through line 12 and fractionated in fractionator 14 with the solvent removed therewith returned from the fractionator to the reactor through line 16. Ethylene dichloride carried off from the reaction 10 as gas with the gaseous products is condensed in a condensor 18 and joined with the liquid ethylene dichloride through line 20 with the liquid being charged to the fractionator 14 for purification. The hydrogen chloride lost from the reactor 10 and the fractionator 14 as vapor is separated and neutralized in a scrubber 22 to which caustic water is added.

In the two stage process shown in FIG. 2 ethylene is charged to the first stage reactor 30 which contains a liquid nitrile solvent. Cupric chloride is also added to the reactor 30 continuously from the second stage reactor (or regenerator) 32 through line 34. Ethylene and cuprous chloride-nitrile complex are continuously removed from the reactor 30 through pipe 36 and flashed in the flash drum 38 to separate the ethylene dichloride overhead through pipe 40. The ethylene dichloride containing vapors are fractionated in fractionator 42 to recover ethylene dichloride as a liquid with the ethylene recovered therefrom being recycled through the reactor 30 through pipe 44. The spent catalyst in the form cuprous chloride nitrile complex and additional solvent are withdrawn from the flash drum 38 and charged to the regenerator 32 wherein the cuprous chloride is subjected to oxychlorination by the introduction of hydrogen chloride and air therein, to form cupric chloride. Nitrile solvent released from the complex is returned with the regenerated cupric chloride through pipe 34 to the reactor 30, as previously stated. The overhead products from the reactor 32 are condensed in a condenser 46 and the condensate stream returned to reactor 30 through pipe 48. Hydrogen chloride is removed from the gases in scrubber 50 in the manner described in conjunction with the process shown in FIG. 1. The reaction conducted the first stage reactor 30 of FIG. 2 is believed to be as follows:

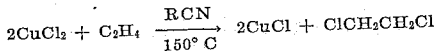

The regeneration reaction conducted in the regenerator vessel 32 is as follows:

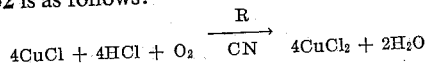

It is hypothesized that the cuprous chloride formed is complexed with the nitrile and that the formation of this complex is the driving force for the reaction between cupric chloride and ethylene in which cuprous chloride is formed. The cuprous chloride-nitrile complex thus formed by the reduction of cupric chloride is then subjected to oxychlorination to regenerate cupric chloride and permit the recovery of the nitrile in its original state. The present invention, however, should not be limited in any way by applicants' statement of their theory of the reaction mechanism.

The vicinal chlorides, that is the 1,2-dichloroalkanes or any dichlorinated hydrocarbon where the chlorine is attached on adjacent carbon atoms, may be produced from any olefinic hydrocarbon such as an acyclic or cyclic aliphatic olefin or a substituted olefin, in either the gaseous or liquid state, for example, ethylene, propylene, and cyclohexene.

The metal salt may be of any of the bi- or polyvalent metal salts either in the anhydrous or hydrated form. Metal salts useful in a redox system should be of a metal in its higher oxidized state so that the metal can be reduced and thereby make chlorine available for reaction with the olefin. Suitable examples of metal salts useful in my present invention are, cupric chloride and ferric chloride.

The solvent which is believed to be a unique feature of our present invention, may be any of the organic nitriles of the form RCN where R is an alkyl or an aryl group, which are liquid at reaction temperatures. Certain nitriles such as phthalonitrile which is solid at room temperature but liquid at reaction temperature, may be utilized as a solvent in our present process. Examples of suitable nitriles are acetonitrile, benzonitrile, and isobutyronitrile.

Our reaction may be performed at a temperature in the range of about 80 to 200° C. preferably at about 125 to 175° C. It is believed that any temperature at which the reaction can be conducted in liquid nitrile will be suitable. The pressure is non-limiting, that is, it can be performed within the range of 50 to 500 p.s.i.g., although preferably it is conducted between 150 and 300 p.s.i.g.

The proportion of olefin, e.g., ethylene, to metal salt, particularly cupric chloride should be maintained at least 1:1 since excess cupric chloride will react with a nitrile solvent as shown in Example XXII to form an inactive copper catalyst which reaction also degenerates some of the solvent. In this respect, benzonitrile was found to be superior to acetonitrile since, as shown in Example XXIII, reaction between cupric chloride and benzonitrile did not deactivate the catalyst to the extent that no appreciable yield of ethylene dichloride was formed as was the case with acetonitrile in Example XXII.

Since $CuCl_2$ reacts more readily with an olefin than with the nitrile solvent, catalyst deactivation is prevented by maintaining an olefin to metal chloride equivalent ratio of at least 1:1, preferably from 1:1 to 10:1, and optimally 1:1 to 5:1.

The following examples serve to illustrate the present invention:

EXAMPLE I (N246–37)

9.15 gms. anhydrous cupric chloride and 60 ml. of acetonitrile were added to a 6 oz. aerosol compatibility tube provided with a valve, pressure gauge, electrical heating jacket and temperature control, and a magnetic stirrer. Air was flushed from the closed reactor by alternate pressurization-depressurization with ethylene, twice to 50 p.s.i.g. and once to 100 p.s.i.g. and ethylene added to a pressure of 105 p.s.i.g. (0.032 mole, 99.5 mole percent $C_2H_4$). The reaction was heated to 154° C. in 0.5 hour and held for approximately 23 hours' reaction time during which the pressure range was 153.5 to 106 p.s.i.g. The reaction mixture was then added to 200 ml. of water and extracted with four 100 ml. portions of isopentane. Gas chromatographic analysis of the combined calcium chloride-dried extracts by a modified internal standard method gave a 54.3 mole percent yield of ethylene dichloride (based on ethylene). The results of this experiment are tabulated in Table I.

EXAMPLE II (N246–41)

The experiment of Example I was repeated using 11.6 gms. cupric chloride dihydrate and ethylene to a pressure of 102 p.s.i.g. (0.031 mole) with a resultant yield of 58.3 mole percent of ethylene dichloride. The results of this experiment are tabulated in Table I. The combined isopentane extracts from Example II were distilled at atmospheric pressure through a vacuum jacketed zig-zag column at a residual liquid (11.2 gm.). Ethylene dichloride was isolated by preparative gas chromatography and identified by infrared spectrophotometry.

EXAMPLE III (N246–63)

The experiment of Example II was repeated and the results of the replicate are shown in Table I.

EXAMPLES IV–VI (N246–63) (N246–65) (N246–66)

Additional runs were made chlorinating ethylene with cupric chloride in the presence of acetonitrile, and the results thereof tabulated in Table I. In Example VI there were two by-products, one of which was identified as vinyl chloride.

TABLE I.—REACTION CONDITIONS [a] FOR LIQUID PHASE ETHYLENE DICHLORIDE SYNTHESES

| Experiment [c] | Solvent | Gases, p.s.i.g. [d] | | Cu (II) Salt [e] | Pressure, p.s.i.g. | Pressure Change, p.s.i. | Temp., °C. | Time, hrs. | EDC [b] | $C_2H_3Cl$ |
|---|---|---|---|---|---|---|---|---|---|---|
| | | $C_2H_4$ | HCl | | | | | | | |
| N246–37 | Acetonitrile | 105 | | $CuCl_2$ | 153–106 | 47 | [g] 155 | 23.2 | 54.3 | 7.0 |
| N246–41 | do | 102 | | $CuCl_2.2H_2O$ | 158–100 | 58 | [g] 152–153 | 22.0 | 58.3 | 6.2 |
| N246–63 | do | 100 | | $CuCl_2.2H_2O$ | 152–101 | 51 | [g] 141–144 | 23.0 | 62.0 | 6.2 |
| N246–65 | do | 102 | | $CuCl_2.2H_2O$ | 127–82 | 45 | [g] 151 | 4.7 | 55.4 | 3.1 |
| N246–66 | do | 105 | | $CuCl_2.2H_2O$ | 57–16 | 41 | [g] 106–108 | 22.75 | 23.8 | |

[a] Performed in Fischer and Porter glass reactor.
[b] Yields based on $CuCl_2$; N246–37 based on ethylene.
[c] Air flushed by ethylene pressurization-depressurization.
[d] CP gases.
[e] Moisture take-up by anhydrous salts was evident.
[f] Temperature of the reaction mixture.
[g] External temperature.

EXAMPLE VII (N292–95)

13.6 gms. of cupric chloride dihydrate and 60 ml. of acetonitrile were added to the reactor tube of Example I, and air removed by evacuation with a mechanical pump to a constant pressure of approximately 85 mm. Ethylene was then added to a pressure of 175 p.s.i.g. (1.68 gms.). The reaction mixture was then heated at 150° C. for six hours with stirring under a pressure of 194 to 149 p.s.i.g.

The reaction mixture was then added at room temperature to 200 ml. of water and extracted with two 100 ml. portions of isopentane. Gas chromatographic analysis of the combined calcium chloride-dried extract by modified internal standard method, gave a 77 mole percent yield of ethylene dichloride (based on $CuCl_2 \cdot 2H_2O$).

EXAMPLE VIII (N292–93)

13.6 gms. of cupric chloride dihydrate and 1.5 gms. ethylene were reacted in a 12 oz. aerosol compatibility tube fitted as in Example VII, containing 120 ml. of benzonitrile. The reaction mixture was heated at 150° C. for 18.5 hours with stirring; the corresponding pressure range was 47 to 17 p.s.i.g. The reaction mixture at room temperature was washed with four 50 ml. portions of water, then suction filtered to give the dark green filtrate. Gas chromatographic analysis of the filtrate gave an 84 mole percent yield of ethylene dichloride. Extraction of the combined water wash with two 50 ml. portions of isopentane and subsequent gas chromatographic analysis gave only a trace of ethylene dichloride.

EXAMPLE IX (N292–86)

The reaction of Example VIII was repeated with 0.08 mole of cupric chloride dihydrate and 0.04 mole of propylene in 60 ml. of acetonitrile at 155° C. for six hours with a pressure range of 131 to 108 p.s.i.g. The yield was 60 mole percent of 1,2-dichloropropane (neither reactant limiting).

EXAMPLE X (N246–76)

84 gms. of cupric chloride dihydrate and 20.2 gms. of cyclohexane were heated under reflux in 500 ml. of acetonitrile for 17 hours. The reaction mixture was extracted at room temperature with four 100 ml. portions of pentane. Gas chromatographic analysis of the combined calcium chloride-dried extract gave a 53.8 mole percent yield of 1,2-dichlorocyclohexane (neither reactant limiting). The pentane extract was distilled without reflux (35–47° C.) to 20.2 gms. of a liquid residue and the product isolated from the liquid residue by preparative gas chromatography and identified by infrared spectrophotometry.

EXAMPLE XI (N325–22)

The reaction of Example VII was repeated using 0.08 mole of anhydrous ferric chloride and 0.04 mole of ethylene in 60 mls. of acetonitrile at 178° C. for 16 hours with a pressure range of 189 to 187 p.s.i.g. The yield of ethylene dichloride was 25 mole percent (neither reactant limiting). Identification of the product was by qualitative gas chromatography.

EXAMPLE XII (N325–25)

0.08 mole of cuprous chloride, 5.2 gms. of hydrogen chloride, and 0.69 gm. of oxygen (as air) were heated at 110° C. for 17.5 hours in acetonitrile to give 100% oxygen conversion (based on cuprous chloride). The nitrogen was evacuated and 2.2 gms. of ethylene added. The mixture was heated with ethylene at 150° C. for six hours at a pressure range of 135 to 140 p.s.i.g. to give an 18 mole percent yield of ethylene dichloride (based on cuprous chloride).

EXAMPLES XIII–XV (N325–8) (N325–4) (N325–6)

The reaction of Example VII was repeated with a temperature at 125° C. using a ratio of ethylene to cupric chloride dihydrate of 0.67/1, 1/1, and 1.5/1 with the results shown in Table II.

EXAMPLES XVI–XVIII (N325–1) (N292–89) (N292–95)

The runs of Examples VII through IX were repeated at approximately 155° C. and the results tabulated in Table II.

EXAMPLES XIX–XXI (N325–10) (N325–12) (N325–14)

The reaction of Examples VII through IX were repeated at 175° C. and the results reported in Table II.

TABLE II.—STUDY OF REACTION CONDITIONS FOR LIQUID PHASE EDC SYNTHESIS [a]

| Experiment | Pressure, p.s.i.g.[b] | Temp, °C. | Equivalents $C_2H_4$ Equivalents $CuCl_2 \cdot 2H_2O$ | Yield, mole percent [c] |
|---|---|---|---|---|
| N325–8  | 87–50   | 125 | 0.67 | 79 |
| N325–4  | 114–67  | 125 | 1    | 65 |
| N325–6  | 152–101 | 125 | 1.5  | 63 |
| N325–1  | 113–96  | 155 | 0.67 | 75 |
| N292–89 | 130–116 | 155 | 1    | 61 |
| N292–95 | 194–149 | 150 | 1.5  | 77 |
| N325–10 | 152–140 | 175 | 0.67 | 58 |
| N325–12 | 165–152 | 175 | 1    | 60 |
| N325–14 | 225–198 | 175 | 1.5  | 73 |

[a] Performed in Fischer and Porter glass reactor; solvent was 60 ml. of $CH_3CN$ in each run; $CuCl_2 \cdot 2H_2O$ was 0.08 mole in each run. Reaction time 6 hrs.
[b] Air was removed by evacuation of reactor.
[c] Analysis by gas chromatography; calculation based on limiting component using modified internal standard method. The yield based on $C_2H_4$ was 42 mole percent in N325–6, 51 mole percent in N292–95, and 48 mole percent in N325–14.

EXAMPLE XXII (N336–5)

13.6 gms. cupric chloride dihydrate and 60 ml. acetonitrile were placed in a six ounce aerosol compatibility tube which was evacuated by mechanical pump to a constant pressure at room temperature and subsequently heated to 140° C. in one hour. The reaction mixture was maintained at about 160° C. for 14.5 hours with stirring and became dark brown. Ethylene at 102 p.s.i.g. was added to the reactor tube at room temperature and the mixture heated to 142° C. in one hour with stirring. The reaction was then maintained at about 155° C. for six hours with stirring; the pressure range was 171–168 p.s.i.g. The lack of a significant pressure drop indicated no reaction with ethylene, presumably because the cupric chloride had previously reacted with the nitrile solvent thus becoming inactive. Ethylene dichloride could not be detected by qualitative gas chromatography or infrared spectroscopy. Mass spectrometric analysis of the gases above the reaction mixture at room temperature showed no chlorinated products.

EXAMPLE XXIII (N325–41)

13.6 gm. cupric chloride dihydrate and 60 ml. benzonitrile were added to a six ounce aerosol compatibility tube and evacuated to 10 mm. using a mechanical pump. The mixture was then brought to 150° C. in 45 minutes and maintained at this temperature for 18 hours with continuous stirring. No significant pressure change occurred. The mixture was cooled to room temperature and 100 p.s.i.g. (0.04 mole) ethylene added. This mixture was heated to 150° C. in 55 minutes and maintained at 150° C. for 6 hours. The pressure range varied from 93–62 p.s.i.g. indicating a reaction occurred. The reaction mixture was filtered to remove solids with subsequent washing of the solids with 100 ml. isopentane. The combined isopentane wash and filtrate were thoroughly mixed and separated in a separation funnel. The isopentane layer showed presence of ethylene dichloride as did the benzonitrile layer by gas chromatographic analysis. The ethylene dichloride yield was found to be 38 mole percent.

Although our present invention has been described with a certain degree of particularity the scope thereof is of the full breadth of the appended claims and should not be limited to the specific embodiments described herein.

We claim:
1. A method for making vicinal dichlorides which comprises:
   reacting a reaction mixture consisting essentially of an aliphatic olefin containing at least one non-conjugated double bond and a chloride of a polyvalent metal in the oxidized state selected from the group consisting of cupric chloride and ferric chloride, in a liquid organic nitrile represented by the formula RCN, where R is selected from the group consisting of lower alkyls and phenyl, at a temperature between about 80 and 200° C. and at a pressure between about 50 and 500 p.s.i.g.

2. The method of claim 1 wherein said chloride is cupric chloride.

3. The method of claim 1 wherein said nitrile is acetonitrile.

4. The method of claim 1 wherein said nitrile is benzonitrile.

5. The method of claim 1 wherein said method is conducted at a temperature between about 125 and 175° C.

6. The method of claim 1 wherein the ratio of said olefin to said chloride is maintained at least 1:1.

7. The method of claim 1 wherein said pressure is between about 150 and 300 p.s.i.g.

8. The method of claim 3 wherein the equivalent ratio of said olefin to said chloride is maintained at from about 1:1 to 10:1.

9. A method for making ethylene dichloride which comprises:
reacting a reaction mixture consisting essentially of ethylene and a chloride of a polyvalent metal in the oxidized state selected from the group consisting of cupric chloride and ferric chloride in a liquid organic nitrile represented by the formula RCN, where R is selected from the group consisting of lower alkyls and phenyl at a temperature of between 80–200° C. and at a pressure between about 50 to 500 p.s.i.g.

10. A method for making vicinal dichloride which comprises:
oxychlorinating an aliphatic olefin containing at least one non-conjugated double bond in the presence of a metal chloride catalyst in a liquid organic nitrile solvent represented by the formula RCN, where R is selected from the group consisting of lower alkyls and phenyl at a temperature between about 80–200° C. at a pressure between about 50 to 500 p.s.i.g.

11. The method of claim 10 wherein said olefin is ethylene.

12. A method for making vicinal dichloride which comprises:
reacting a reaction mixture consisting essentially of an aliphatic olefin containing at least one non-conjugated double bond in the presence of a metal chloride catalyst selected from the group consisting of ferric chloride and cupric chloride with hydrogen chloride and an oxygen containing gas in a liquid organic nitrile solvent represented by the formula RCN, where R is selected from the group consisting of lower alkyls and phenyl, at a temperature between about 80 and 200° C. and at a pressure sufficient to maintain the solvent in the liquid phase.

13. A method for producing ethylene dichloride which comprises the steps:
reacting a reaction mixture consisting essentially of cupric chloride and ethylene in the liquid phase at a temperature between about 80 to 200° F. and a pressure between about 50 and 500 p.s.i.g. in the presence of an organic nitrile solvent represented by the formula RCN, where R is selected from the group consisting of lower alkyls and phenyl, separating the ethylene dichloride produced by said reaction from the reduced cuprous chloride, and reacting said cuprous chloride with hydrogen chloride and an oxygen-containing gas to regenerate the cupric chloride.

References Cited

UNITED STATES PATENTS

| | | | |
|---|---|---|---|
| 3,079,444 | 2/1963 | Jacobowsky et al. | 260—654 |
| 3,194,847 | 7/1965 | Capp et al. | 260—659 |
| 3,206,517 | 9/1965 | Fenton | 260—656 |
| 3,214,481 | 10/1965 | Heinemann et al. | 260—659 |
| 3,214,482 | 10/1965 | Caiopiesso et al. | 260—659 |

OTHER REFERENCES

Asscher et al.: J. Chem. Soc. (London), (March 1963, QD 1C6), pp. 1887–1896.

LEON ZITVER, *Primary Examiner.*

K. V. ROCKEY, T. G. DILLAHUNTY,
*Assistant Examiners.*